Oct. 17, 1967  I. MANKOWICH ET AL  3,347,971
ROTATIONAL MOLDING
Filed June 17, 1963
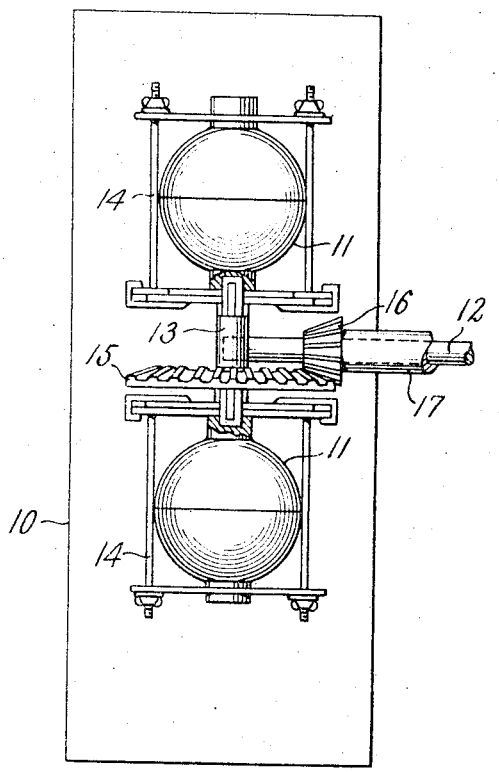

3,347,971
ROTATIONAL MOLDING

Ivan Mankowich, Cheshire, Andrew D. Varenelli, Stratford, and Alfred J. Heinrichs, New Haven, Conn., assignors to Uniroyal, Inc., a corporation of New Jersey
Filed June 17, 1963, Ser. No. 288,500
The portion of the term of the patent subsequent to Dec. 20, 1983, has been disclaimed
5 Claims. (Cl. 264—310)

This invention relates to a method of molding hollow articles from plasticized thermoplastic resin.

It has long been known that hollow articles such as balls, dolls, shoes, etc. can be molded from liquid polymer systems, such as rubber or vinyl resins. For example, United States Patent 1,998,897 granted Apr. 23, 1935, to Kay discloses a "rotational casting" method of manufacturing hollow articles from a heat sensitive latex. In this method a measured charge of the heat sensitive latex is deposited in a closed mold which is then rotated in a plurality of planes. As the mold rotates the latex flows over the inner molding surfaces of the mold. Simultaneously with the rotation of the mold, heat is applied thereto to gel the latex in the form of a thin skin on the inner walls of the mold. The gelled product is subsequently removed from the mold.

With the advent of vinyl resin plastisols these compounds were used in this rotational casting technique. Plastisols and their use are well known to those skilled in the art; see for example Modern Plastics, volume 26, page 28 (April 1949), by Perrone and Neuwirth. To rotationally cast a plastisol, a measured charge of plastisol is deposited in a closed mold, and the mold is rotated in a plurality of planes while the plasistol is heated to flux the same as a thin skin on the inner wall of the mold. The skin is then cooled down, and the molded article removed from the mold; see, for example, "A Survey of Literature and Patents Pertaining to Vinyl Plastisol Technology and Rotational Casting," by Whittington (1961 Smail Creative Printing, Inc., Ashland, Ohio).

Alternatively, hollow articles have been cast from plastisols by the so-called "slush molding" technique as disclosed, for example, in Patent 2,974,373 granted Mar. 14, 1961 to Streed et al. In the "slush molding" technique a hollow mold is filled completely with plasistol after which heat is applied to the filled mold to gel a thin skin of resin on the inner walls of the mold. After the skin has been gelled, the excess plastisol is poured from the mold, and the mold with the skin adhering to the inner surface is then further heated to complete the fluxing of the plasistol. The skin is then cooled down, and the molded article removed from the mold.

This invention relates to a novel method of making hollow articles of plasticized thermoplastic reisn in which compounds having a prior heat history are employed. This invention uses a compound containing thermoplastic resin and a plasticizer therefor, and, if desired, also containing other compounding ingredients such as fillers, stabilizers, lubricants, pigments, blowing agents and the like. These materials are preblended and then fluxed in Banburies, or mills, or extruders, or Henschel mixers, or in other fluxing equipment. The fluxed compound is then fragmented, if necessary, into particles of sufficiently small size that a mass thereof when rotated in a mold is fluent. In the case of a Henschel and similar mixers, further fragmentation may not be necessary. These fragments may be in the form of granules, diced particles, etc.

According to this invention a measured fluent charge of fragments of the fluxed thermoplastic resin and plasticizer compound is deposited in a mold with the charge less in volume than the volume of the mold. The mold containing the measured charge is rotated in a plurality of planes, and simultaneously the fragments are heated to a coalescing temperature to distribute the compound in a coalesced layer over the surface of the mold in the form of the object to be molded. Thereafter the layer is cooled beneath the melting temperature of the compound, and finally the molded article is removed from the mold.

The figure of the drawing is an elevational view of apparatus useful in practicing the method of this invention.

Two spherical molds 11 rotate within an oven indicated in outline at 10. A rotatable shaft 12 extends into oven 10 and carries on its end a support 13 for two openable clamp carriers 14 journaled on support 13 and each adopted to clampingly receive the two halves on each spherical mold 11. Fixed to carriers 14 are gears 15 (only one is shown in the drawing) that mesh with a gear 16 on a sleeve 17 about shaft 12. As shaft 12 rotates molds 11 are revolved about the axis of shaft 12. At the same time, gear 16, which may be stationary or suitably rotated, causes the molds to rotate additionally about their own axes.

The following specific examples will further illustrate the invention. In these examples all parts given are by weight, and per hundred parts of resin.

TABLE I

| | A | B | C | D | E | F | G |
|---|---|---|---|---|---|---|---|
| VR-26 [Marvinol brand of polyvinyl chloride resin of about .20 specific viscosity] (Specific viscosity = Solution visc. ¹/Solvent visc.—1) | 100 | 100 | 100 | 100 | 100 | 100 | |
| VR-22 [Polyvinyl chloride resin of about .44 specific viscosity] | | | | | | | 100 |
| Tricresyl Phosphate | | | | | | 90 | 130 |
| Di-(2-ethylhexyl) Phthalate | 50 | 50 | 50 | 25 | | | |
| Didecyl adipate | | | | 20 | | | |
| Polymeric plasticizer [Paraplex G54, an intermediate molecular weight polyester plasticizer (Mol. wt. 3,500)] | | | | | 90 | | |
| Mark LL [Ba-Cd Phenate type Stabilizer by Argus Chem. Co.] | 2 | 2 | 3 | 3 | 2 | 2 | 2 |
| Epoxidized soybean oil | | | 5 | 5 | | | |
| Mark PL [Zn-2 Ethyl Hexanate complex type Stabilizer by Argus Chem. Co.] | .5 | .5 | .5 | .5 | .5 | .5 | .5 |
| Mark C [Alkyl aryl phospite chelator by Argus Chem. Co.] | .5 | .5 | .5 | .5 | .5 | .5 | .5 |
| Stearic acid | .25 | .5 | .11 | .11 | .25 | .5 | .25 |
| Atomite [Calcium carbonate] | | 20 | | | | 80 | |
| Red pigment paste [Rubine Red by Claremont] | | | .16 | | | | |

¹ .2 gram polymer dissolved in 50 ml. nitrobenzene.

Each of compounds A through G was first diced to approximately cubic configuration fragments, approximately ⅛" on a side.

200 grams of diced compound D plus 25 grams of diced compound C were weighed at room temperature in an aluminum spherical mold 6½ inches in diameter. A valve was positioned on a pin within this mold. The charged mold was placed in a forced draft oven preheated to 500° F. and rotated at 8 r.p.m. for 15 minutes. The hot mold was then removed and quenched in a room temperature water bath, cooled, opened and a ball removed, the valve, having been encapsulated in the molten vinyl, was incorporated in the ball shell. Air was introduced through the valve to inflate the ball. The molded product was a multicolored play ball approximately 6½ inches in diameter which can also be inflated to a larger diameter if desired.

Five additional balls were molded in the same mold from diced compounds A, B, E, F and G. In each of the five cases a 220 gram charge was deposited in the mold, and the mold was rotated for 15 minutes in the forced draft hot air oven preheated to 500° F. at a rotational speed of 8 r.p.m.; quenched; the ball removed and inflated. In all cases excellent balls were produced.

One-eighth inch diced particle fragments were found to be sufficiently fluent to work very well, but particles of equal weight and different geometrical shape may also be used. Very good results are obtained with fragments having a maximum dimension between about one-sixteenth inch and about three-sixteenth inch and this size is preferred. Smaller fragments may be used, but it becomes more costly to produce the smaller particles from the prefluxed material. In general the smaller the fragment the less critical are the processing conditions to produce an acceptable product. Granules may also be employed. Preferably the fragments will have a maximum dimension of ½ inch or less. Irregular shapes may be employed; for example cylinders which are relatively long as compared to their diameters can be employed. In general the maximum dimension of these fragments should be less than about one-half inch. If the fragments have too large a dimension, it becomes difficult to completely refuse the fragments to produce acceptable products within acceptable time cycles. The size of the mold and the wall thickness of the product will affect the size of the particles to be used, the longer the mold or the thicker the walls the larger, in general, the particles may be.

Compounds A to G inclusive were prepared by blending all components together and dropping them on a hot two-roll 16 inch differential speed mill. The roll temperature varied between approximately 250–300° F. and the components were mixed on the mill until fluxed, stripped from the mill, and then diced.

As would be expected the time cycle in the heat will depend in part upon the compound and the temperatures employed. For example, if the oven temperature is increased to 575° F. from 500° F. the time cycle can be reduced to 10 minutes from 15 minutes with the above Examples A, B, E, F and G. Excessive temperatures which will burn the compound must of course be avoided, yet the temperature must be sufficiently high to refuse the compound.

The rotational speed employed may vary. In general the rotational speeds will be low to permit proper coverage of the mold, and will not be much above about 5–20 r.p.m.

Fillers may be employed, as in compounds B and F, by suitably adjusting the remainder of compound.

The instant invention has a number of advantages over rotational casting methods previously in use. For example, less expensive grades of resin may be employed. Defective items may be re-fragmented and remolded successively at a great saving in scrap to a fabricator. Further, material handling is greatly simplified as compared to the previously used plastisol systems since the material at all times, except when it is confined in the mold, is a dry material.

Various resins may be used in the method. Thus work has been done with resins which are homopolymers ranging from moderately high molecular weight (Example G) to low molecular weight (Examples A–F). Vinyl chloride vinyl acetate copolymers can be substituted for part or all of the resin requirement. Internally plasticized polyvinyl chloride can also be used. In general resins of which vinyl chloride is at least 50% of the monomer system are preferred.

Various plasticizers may be employed. Thus, monomeric, polymeric and solvating types have been used successfully.

Having thus described our invention, what we claim and desire to protect by Letters Patent is:

1. A method of making hollow articles of plasticized thermoplastic resin comprising, depositing in a mold a fluent measured charge of fragments of a fluxed compound of a thermoplastic resin of which vinyl chloride is at least 50% by weight of the monomer system and a plasticizer therefor, said charge being less in volume than the volume of said mold, said fragments having a maximum volumetric size of less than .125 in.$^3$ but not less than about .000244 in.$^3$, rotating the mold in a plurality of planes while heating the fragments to distribute the compound, and coalesce the fragments into a layer over the surface of the mold in the form of the object to be molded, cooling the compound in the layer beneath the melting temperature thereof, and removing the article from the mold.

2. A method of making hollow articles of plasticized thermoplastic resin comprising, depositing in a mold a fluent measured charge of fragments of a fluxed compound of a thermoplastic resin of which vinyl chloride is at least 50% by weight of the monomer system and a plasticizer therefor, said charge being less in volume than the volume of said mold, said fragments having a maximum volumetric size not greater than .0156 in.$^3$, but not less than about .000244 in.$^3$, rotating the mold in a plurality of planes while heating the fragments to distribute the compound and coalesce the fragments into a layer over the surface of the mold in the form of the object to be molded, cooling the compound and the layer beneath the melting temperature thereof, and removing the aritcle from the mold.

3. A method in accordance with claim 2 in which the maximum volumetric size of the fragments is not more than about .0066 in.$^3$.

4. A method in accordance with claim 3 wherein the fragments are diced.

5. A method in accordance with claim 3 wherein the fragments are granules.

References Cited

UNITED STATES PATENTS 3,117,346  1/1964  Bertin et al.

FOREIGN PATENTS 500,298  2/1939  Great Britain.
585,395  2/1947  Great Britain.
911,646  11/1962  Great Britain.

ROBERT F. WHITE, *Primary Examiner.*

ALEXANDER H. BRODMERKEL, *Examiner.*

J. R. DUNCAN, S. HELLER, S. I. LANDSMAN,
*Assistant Examiners.*